(12) United States Patent
Kao et al.

(10) Patent No.: US 9,900,050 B2
(45) Date of Patent: Feb. 20, 2018

(54) COMMUNICATION VERIFICATION SYSTEM AND METHOD OF USING THE SAME

(71) Applicant: ATEN International Co., Ltd., New Taipei (TW)

(72) Inventors: Wei Kao, New Taipei (TW); Hao-Tai Hsu, Taipei (TW)

(73) Assignee: ATEN INTERNATIONAL CO., LTD., New Taipei (TW)

( * ) Notice: Subject to any disclaimer, the term of this patent is extended or adjusted under 35 U.S.C. 154(b) by 0 days.

(21) Appl. No.: 14/832,745

(22) Filed: Aug. 21, 2015

(65) Prior Publication Data
US 2016/0182123 A1    Jun. 23, 2016

(30) Foreign Application Priority Data

Dec. 23, 2014    (TW) .............................. 103145053 A

(51) Int. Cl.
*H03K 11/00* (2006.01)
*H04L 25/60* (2006.01)
(Continued)

(52) U.S. Cl.
CPC ............... *H04B 3/36* (2013.01); *G09G 5/006* (2013.01); *H04B 1/04* (2013.01); *H04B 1/16* (2013.01);
(Continued)

(58) Field of Classification Search
None
See application file for complete search history.

(56) References Cited

U.S. PATENT DOCUMENTS 5,095,528 A * 3/1992 Leslie ................ H04B 7/15535
                                                        455/10
7,242,766 B1   7/2007 Lyle
(Continued)

FOREIGN PATENT DOCUMENTS

CN         1826786 A      8/2006
CN       101471767 B      9/2011
(Continued)

OTHER PUBLICATIONS

Taiwanese Office Action, dated Nov. 10, 2015, in a counterpart Taiwanese patent application, No. TW 103145053.
(Continued)

*Primary Examiner* — Shuwang Liu
*Assistant Examiner* — Gina McKie
(74) *Attorney, Agent, or Firm* — Chen Yoshimura LLP

(57) ABSTRACT

A communication verification system is provided. The communication verification system includes a local transmitting-end unit, a remote receiving-end unit, and a repeater device. The local transmitting-end unit is set to a first computing mode and outputs an initial value. The remote receiving-end unit is set to a second computing mode. The repeater device receives the initial value from the local transmitting-end unit and outputs an initial value to the remote receiving-end unit according to the second computing mode. The repeater device receives and stores a computation result from the remote receiving-end unit, and then outputs a confirmation signal to the local transmitting-end unit according to the first computing mode. The repeater device outputs the computation result to the local transmitting-end unit for verification when the repeater device receives a query signal from the local transmitting-end unit.

16 Claims, 7 Drawing Sheets

(51) Int. Cl.
    *H04L 25/64* (2006.01)
    *H04B 3/36* (2006.01)
    *H04B 1/04* (2006.01)
    *H04B 1/16* (2006.01)
    *H04N 7/167* (2011.01)
    *H04N 21/258* (2011.01)
    *H04N 21/647* (2011.01)
    *H04N 21/60* (2011.01)
    *G09G 5/00* (2006.01)

(52) U.S. Cl.
    CPC ..... *H04N 7/1675* (2013.01); *H04N 21/25816* (2013.01); *H04N 21/60* (2013.01); *H04N 21/64723* (2013.01); *G09G 2358/00* (2013.01); *G09G 2370/045* (2013.01); *G09G 2370/12* (2013.01)

(56) References Cited

U.S. PATENT DOCUMENTS

| | | |
|---|---|---|
| 7,742,438 B1 | 6/2010 | Xu et al. |
| 8,296,393 B2 | 10/2012 | Alexander et al. |
| 8,332,482 B2 | 12/2012 | Alexander et al. |
| 2003/0214507 A1* | 11/2003 | Mawatari ............... G09G 5/006 345/530 |
| 2004/0073793 A1 | 4/2004 | Takeda |
| 2005/0021885 A1 | 1/2005 | Anderson et al. |
| 2006/0072609 A1 | 4/2006 | Tanabe et al. |
| 2008/0122784 A1 | 5/2008 | Hsieh et al. |
| 2008/0252782 A1 | 10/2008 | Komeno |
| 2009/0055709 A1 | 2/2009 | Anderson et al. |
| 2009/0070479 A1 | 3/2009 | Anderson et al. |
| 2012/0033129 A1 | 2/2012 | Miura et al. |
| 2012/0144200 A1* | 6/2012 | Liu ...................... H04L 9/0844 713/171 |
| 2013/0111578 A1* | 5/2013 | Okada .................... G06F 21/00 726/16 |
| 2013/0167188 A1 | 6/2013 | Lee |
| 2013/0346737 A1 | 12/2013 | Yu et al. |
| 2014/0129827 A1* | 5/2014 | Khosravi ............. H04L 9/0825 713/156 |
| 2014/0372759 A1* | 12/2014 | Ramachandran ........................ H04N 21/25816 713/171 |

FOREIGN PATENT DOCUMENTS

| | | |
|---|---|---|
| CN | 101141492 B | 11/2014 |
| EP | 1924095 | 5/2008 |
| EP | 2418870 | 2/2012 |
| EP | 2608563 | 6/2013 |
| TW | 200637398 A | 10/2006 |
| TW | 201401818 A | 1/2014 |

OTHER PUBLICATIONS

European Search Report in counterpart application EP 15190413.3, dated Apr. 20, 2016.

* cited by examiner

COMMUNICATION VERIFICATION SYSTEM AND METHOD OF USING THE SAME

BACKGROUND OF THE INVENTION

Field of the Invention

This invention relates to a communication verification system, and in particular, it relates to a communication verification system useful for extending the transmission distance of communication devices.

Description of the Related Art

Protection of digital data has been an important topic given the advancement of digital technologies. To ensure that digital audio-visual data is not illegally duplicated when transmitted through communication interfaces, developers often add protection mechanisms at the transmitting end, and the corresponding receiving end requires corresponding decoding mechanisms in order to read and display the data content.

Take High-Bandwidth Digital Content Protection (HDCP) technology, a digital content protection technology developed by Intel, as an example, before and during digital audio-visual data transmission, the HDCP transmitting unit performs verification for the connected HDCP receiving unit, to ensure that the HDCP receiving unit is authorized.

Specifically, under the HDCP technology, two computing modes are defined for the HDCP transmitting units to perform verification. Under one computing mode (the first computing mode), the HDCP transmitting unit first transmits an initial value, and after the HDCP receiving unit replies with a confirmation signal, the HDCP transmitting unit transmits a query signal to request the HDCP receiving unit to transmit the computation result. Under the other computing mode (the second computing mode), the HDCP transmitting unit first transmits an initial value, and the HDCP receiving unit immediately transmits back the computation result. Under the first computing mode, the HDCP transmitting unit determines whether the elapsed time from when it transmits the query signal to when it receives the computation result satisfies a predetermined time limitation (for example, under 7 ms), and confirms the correctness of the computation result. Under the second computing mode, the HDCP transmitting unit determines whether the elapsed time from when it transmits the initial value to when it receives the computation result satisfies a predetermined time limitation, and confirms the correctness of the computation result. If the elapsed time for receiving the computation result from the HDCP receiving unit exceeds the time limitation, that HDCP receiving unit will be deemed unauthorized. However, while an HDCP receiving unit constructed according to these computing modes can satisfy the above described time limitations, the transmission distance between the HDCP transmitting unit and the HDCP receiving unit is limited for this reason and cannot be extended. Thus, for data transmission between the HDCP transmitting unit and the HDCP receiving unit, a solution is needed to effectively extend the transmission range while satisfying the time limitation.

SUMMARY OF THE INVENTION

An object of the present invention is to provide a communication verification method, where the local transmitting-end unit and the remote receiving-end unit are set to different computing modes, in order to solve the problem of limitations on the transmission time.

Another object of the present invention is to provide a communication verification system which allows the transmission range of the communication device to be extended.

In one embodiment, the present invention provides a communication verification system, which includes a local transmitting unit, a remote receiving unit, and a repeater device. The local transmitting unit is set to a first computing mode and outputs an initial value. The remote receiving unit is set to a second computing mode. The repeater device receives the initial value from the local transmitting unit and outputs an initial value to the remote receiving unit according to the second computing mode. The repeater device receives and stores a computation result from the remote receiving unit, and then outputs a confirmation signal to the local transmitting unit according to the first computing mode. When the repeater device receives a query signal from the local transmitting unit, the repeater device outputs the computation result to the local transmitting unit for verification.

In another embodiment, the present invention provides a communication verification method, which includes: setting a local transmitting unit to a first computing mode, and setting a remote receiving unit to a second computing mode; a repeater device receiving an initial value from the local transmitting unit, and outputting an initial value to the remote receiving unit according to the second computing mode; the repeater device receiving and storing a computation result from the remote receiving unit, and outputting a confirmation signal to the local transmitting unit according to the first computing mode; when the repeater device receives a query signal from the local transmitting unit, the repeater device outputting the computation result to the local transmitting unit for verification. Such a communication verification method uses the repeating device to extend the range between the local transmitting unit and the remote receiving unit.

DETAILED DESCRIPTION OF THE PREFERRED EMBODIMENTS

A communication verification system is disclosed which supports digital content protection. In one embodiment, the communication verification system may be a networked communication verification system, which includes a local transmitting unit and a repeater device. The local transmitting unit can perform verification for a remote receiving unit.

Figure 1:
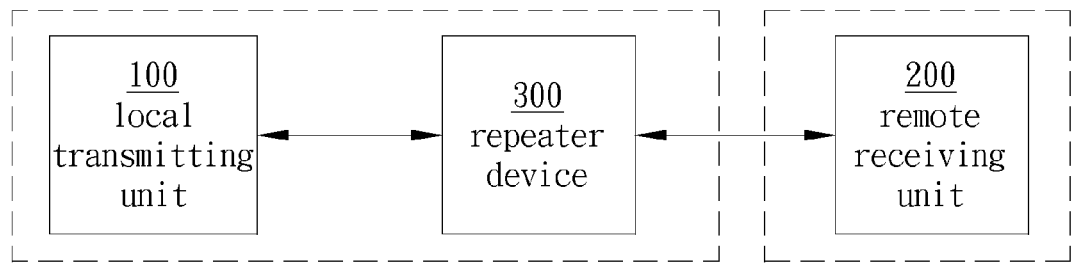
FIG. 1 schematically illustrates a communication verification system according to a first embodiment of the present invention.

FIG. 1 schematically illustrates a communication verification system according to a first embodiment of the present invention. As shown in FIG. 1, the communication verification system includes a transmitting unit 100 (local transmitting unit), a receiving unit 200 (remote receiving unit) and a repeater device 300. In one implementation, the communication verification system uses devices that comply with a first communication protocol, such as HDCP devices. The repeater device 300 is coupled to the transmitting unit 100 and is located close to the transmitting unit 100, as shown in FIG. 1, where the transmitting unit 100 and the repeater device 300 are depicted within the dashed-line box, referred to as the local end. On the other side, the repeater device 300 is coupled to the receiving unit 200. The receiving unit 200 is depicted in another dashed-line box, referred to as the remote end. Relative to the repeater device 300, the transmitting unit 100 is the local transmitting end, and the receiving unit 200 is the remote receiving end. In other words, the repeater device 300 is located closer to the local transmitting end than to the remote receiving end. In this embodiment, the local transmitting end (transmitting unit 100) and the remote receiving end (receiving unit 200) are set to different computing modes, and perform signal forwarding and device verification via the repeater device 300, as will be explained in more detail later with reference to FIG. 3.

Figure 2:
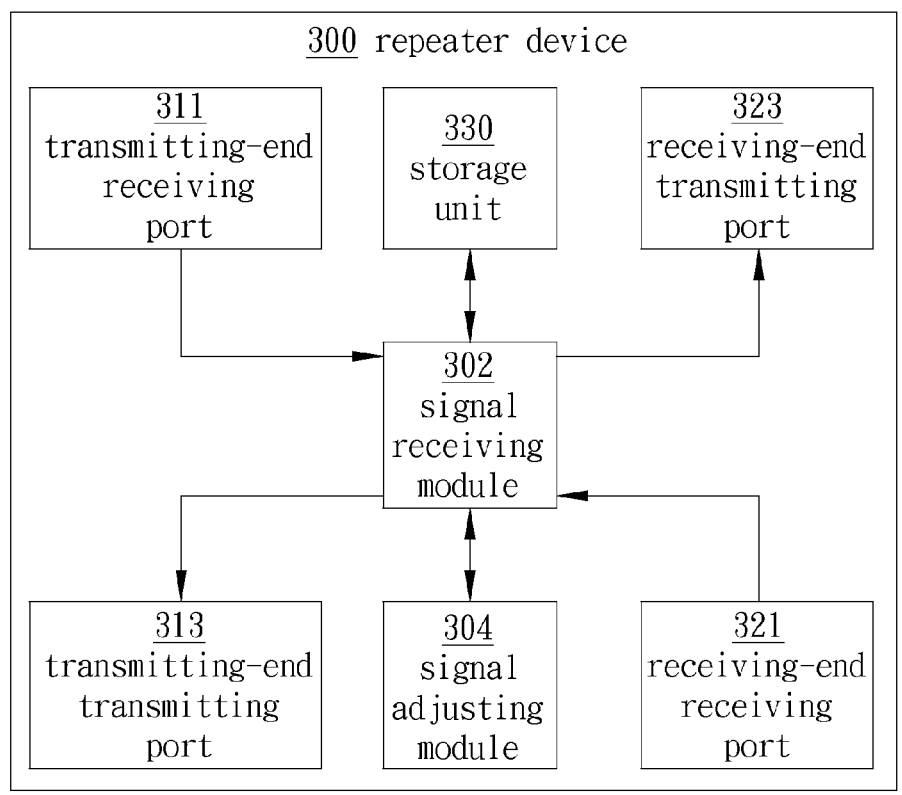
FIG. 2 schematically illustrates the repeater device of the first embodiment.

Referring to FIG. 2, which schematically illustrates the repeater device of the first embodiment. As shown in FIG. 2, the repeater device 300 includes a transmitting-end receiving port 311, a transmitting-end transmitting port 313, a receiving-end receiving port 321, and a receiving-end transmitting port 323, for communicating signals between the local transmitting end and remote receiving end. The repeater device 300 further includes signal receiving module 302 and signal adjusting module 304 which can be used to set the above-mentioned different computing modes. Briefly, when the signal receiving module 302 receives a computing-mode signal (from either the local transmitting end or the remote receiving end), it determines whether signal adjustment is required; if signal adjustment is required, the signal adjusting module 304 generates a control signal which is outputted to the corresponding end (either the local transmitting end or the remote receiving end) via the respective transmitting ports.

Figure 3:
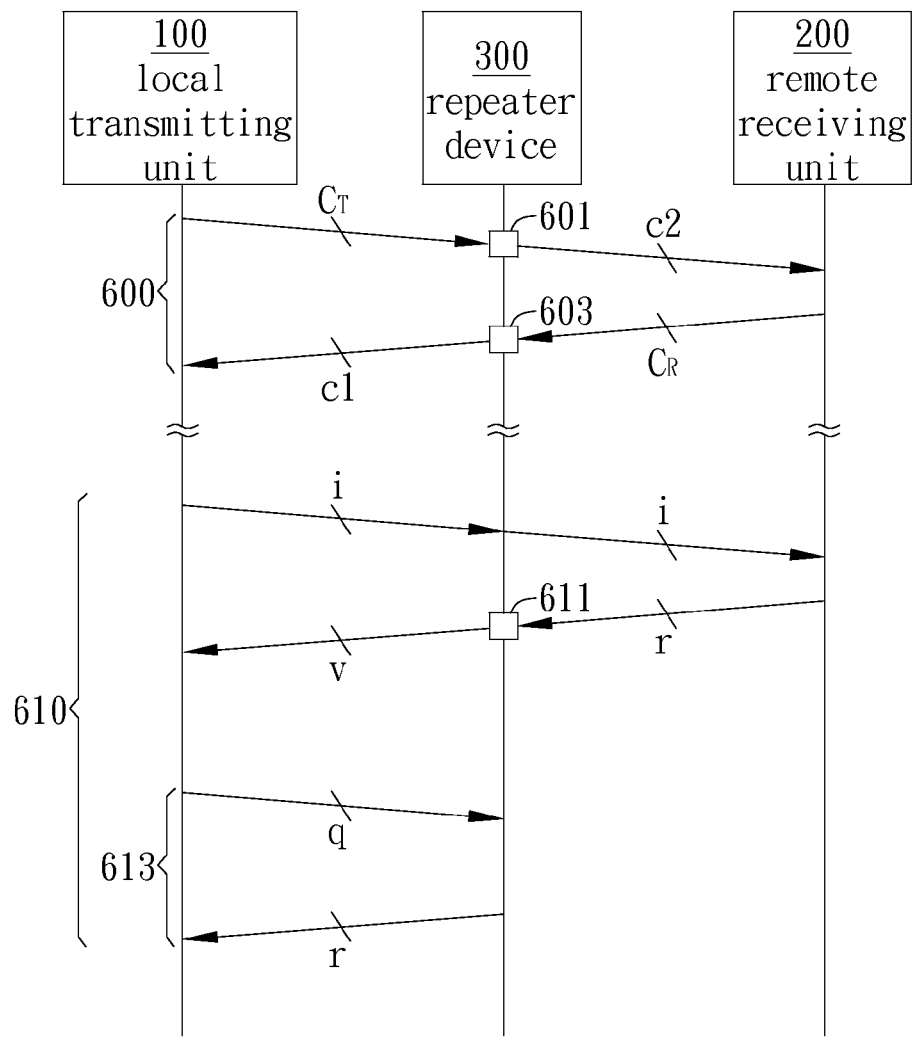
FIG. 3 schematically illustrates the timing of events in the communication verification system of the first embodiment.

FIG. 3 schematically illustrates the timing of events in the communication verification system of the first embodiment. As shown in FIG. 3, the local transmitting end (transmitting unit 100) and the remote receiving end (receiving unit 200) achieves signal transmission via the repeater device 300, and the order of events may be divided to a setting stage 600 and a verification stage 610. Referring to FIGS. 2 and 3, during the setting stage 600, the repeater device 300 sets the computing modes of the local transmitting end (transmitting unit 100) and the remote receiving end (receiving unit 200). More specifically, the repeater device 300 receives a transmitting-end computing-mode signal $C_T$ from the local transmitting end (transmitting unit 100). The repeater device 300 then outputs a second computing-mode signal C2 to the remote receiving end (receiving unit 200). As mentioned earlier, the signal receiving module 302 and signal adjusting module 304 can be used to set the computing modes. In other words, at time point 601 shown in FIG. 3, the repeater device 300 performs determination and adjustment of the computing-mode signal. The signal receiving module 302 determines the content of the transmitting-end computing-mode signal $C_T$ to generate a determination result. For example, if the transmitting-end computing-mode signal $C_T$ does not comply with the computing mode required by the remote receiving end (i.e. the second computing mode), then the determination result indicates that the signal content needs to be adjusted, and the determination result is forwarded to the signal adjusting module 304. The signal adjusting module 304 generates a control signal and sends it back to the signal receiving module 302, and based on the control signal, the signal receiving module 302 outputs the second computing-mode signal C2 to the remote receiving end (receiving unit 200) via the receiving-end transmitting port 323. On the other hand, if the determination result indicates that the signal does not need to be adjusted, the repeater device 300 directly output the transmitting-end computing-mode signal $C_T$ to the remote receiving end (receiving unit 200).

Similarly, the repeater device 300 receives a receiving-end computing-mode signal $C_R$ from the remote receiving end (receiving unit 200). The repeater device 300 outputs a first computing-mode signal C1 to the local transmitting end (transmitting unit 100). As mentioned earlier, the signal receiving module 302 and signal adjusting module 304 can be used to set the computing modes. In other words, at time point 603 shown in FIG. 3, the repeater device 300 performs determination and adjustment of the computing-mode signal. The signal receiving module 302 determines the content of the receiving-end computing-mode signal $C_R$ to generate a determination result. For example, if the receiving-end computing-mode signal $C_R$ does not comply with the computing mode required by the local transmitting end (i.e. the first computing mode), then the determination result indicates that the signal content needs to be adjusted, and the determination result is forwarded to the signal adjusting module 304. The signal adjusting module 304 generates a control signal and sends it back to the signal receiving module 302, and based on the control signal, the signal receiving module 302 outputs the first computing-mode signal C1 to the local transmitting end (transmitting unit 100) via the transmitting-end transmitting port 313. On the other hand, if the determination result is that the signal does not need to be adjusted, the repeater device 300 directly output the receiving-end computing-mode signal $C_R$ to the local transmitting end (transmitting unit 100). It should be noted that, in the setting stage 600, the setting of the computing motes by the repeater device 300 is not limited to the above-described order; e.g., the setting for the local transmitting end can occur at time point 601 and the setting for the remote receiving end can occur at time point 603.

From the above description, it can be understood that the local transmitting end (transmitting unit 100) is set to the first computing mode and the remote receiving end (receiving unit 200) is set to the second computing mode. In one implementation, the first and second computing modes are set using the HDCP version 2.1 protocol as the first communication protocol. As shown in FIG. 3, in the verification stage 610, the local transmitting end (transmitting unit 100) performs verification for the remote receiving end (receiving unit 200). Specifically, the local transmitting end (transmitting unit 100) outputs an initial value i. The repeater device 300 receives the initial value i from the local transmitting end, and outputs an initial value i based on the second computing mode to the remote receiving end (receiving unit 200). For example, the initial value i may be a random value or other parameters to be calculated. The remote receiving end (receiving unit 200) receives the initial value i and generates a computation result r, and transmits it back to the repeater device. The repeater device 300 receives the computation result r from the remote receiving end and stores it, and outputs a confirmation signal v based on the first computing mode to the local transmitting end. Referring to FIGS. 2 and 3, as shown in FIG. 2, the repeater device 300 includes a storage unit 330 for receiving the computation result. In other words, the repeater device 300 stores the computation result r at time point 611 shown in FIG. 3. For example, if the signal receiving module 302 determines that the signal received by the receiving-end receiving port 321 is the computation result corresponding to the initial value, it stores the computation result in the storage unit 330.

Then, after receiving the confirmation signal v, the local transmitting end (transmitting unit 100) transmits a query signal q. When the repeater device 300 receives the query signal q from the local transmitting end (transmitting unit 100), the repeater device 300 outputs the computation result r to the local transmitting end (transmitting unit 100) for verification. As mentioned earlier, under the first computing mode, the local transmitting end determines whether the elapsed time between the transmission of the query signal and the receipt of the computation result satisfies a predetermined time limitation. In other words, the local transmitting end calculates an elapsed time 613 between the query signal q and the computation result r shown in FIG. 3. If the computation result is correct and the elapsed time satisfies the time limitation, the local transmitting end (transmitting unit 100) determines that the remote receiving end (receiving unit 200) is an authorized device.

Stated generally, the communication verification system of this embodiment utilizes a repeater device to set the local transmitting end (transmitting unit 100) and remote receiving end (receiving unit 200) to different settings (i.e. different computing modes). As described above, setting the local transmitting end (transmitting unit 100) to the first computing mode requires the process of transmitting the initial value, receiving the confirmation signal, transmitting the query signal and receiving of the computation result. Setting the remote receiving end (receiving unit 200) to the second computing mode requires the process of receiving the initial value and responding with the computation result. In other words, as long as the repeater device is located within a transmission range that satisfies the time limitation (i.e. the repeater device is located close to the local transmitting end (transmitting unit 100)), and by utilizing the different settings, the repeater device 300 can, before transmitting the confirmation signal, stores the computation result received from the remote receiving end (receiving unit 200); thus, after transmitting the confirmation signal, it can ensure that the computation result is transmitted back to the local transmitting end within the required time limitation. As a result, the distance between the remote receiving end (receiving unit 200) and the local transmitting end (transmitting unit 100) can be extended, i.e. the remote receiving end (receiving unit 200) is not limited by the transmission range of the local transmitting end (transmitting unit 100) and the transmission content can still be protected.

Figure 4:
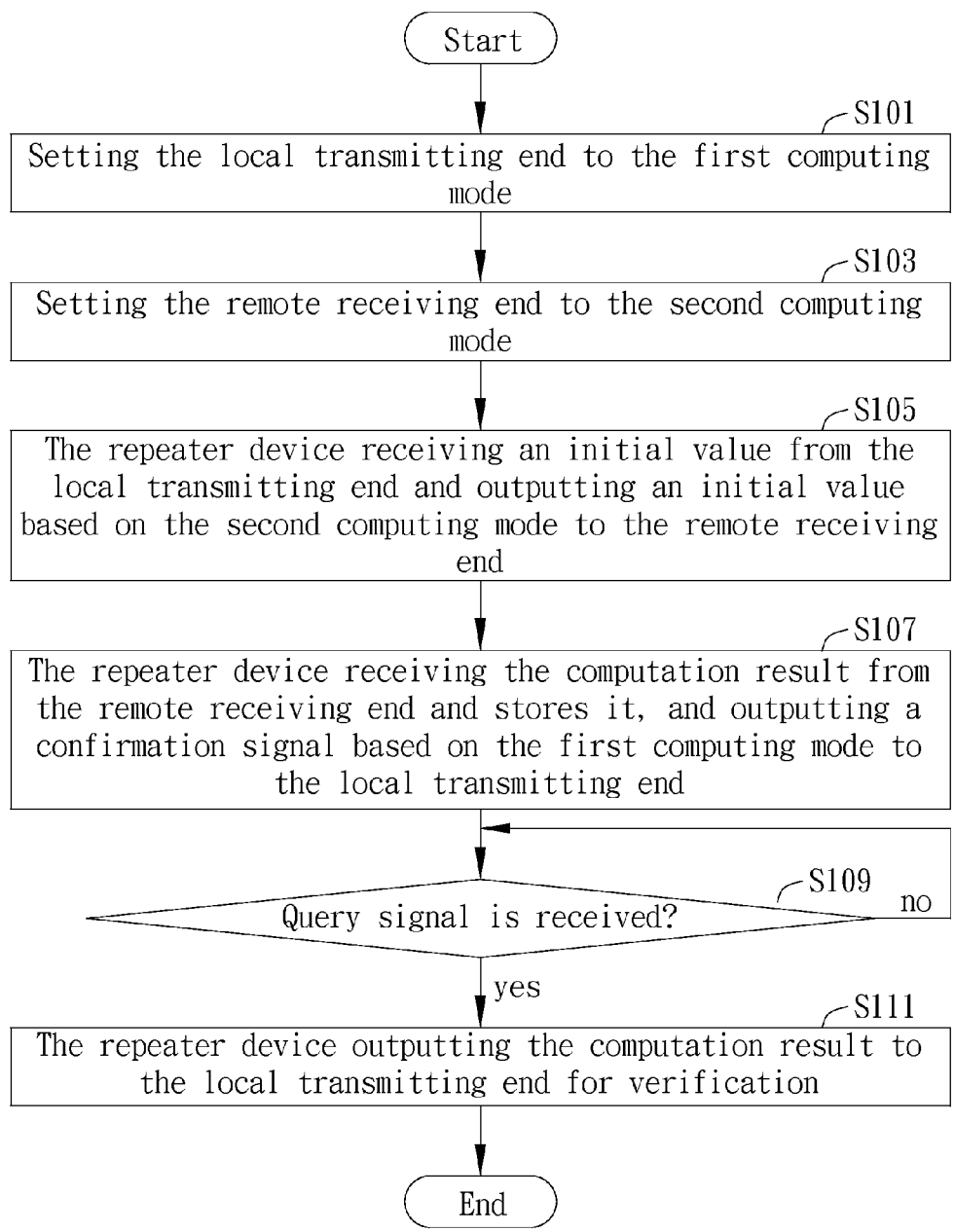
FIG. 4 is a flow chart of a communication verification method according to the first embodiment.

FIG. 4 is a flow chart of a communication verification method according to this embodiment. As shown in FIG. 4, the communication verification method includes steps S101 to S111. In step S101, the local transmitting end is set to a first computing mode. In step S103, the remote receiving end is set to a second computing mode. In one implementation, the first computing mode and second computing mode are set using the HDCP version 2.1 protocol as the first communication protocol.

In step S105, the repeater device receives an initial value from the local transmitting end, and outputs an initial value based on the second computing mode to the remote receiving end. The initial value may be a random value or other parameters to be calculated. The remote receiving end receives the initial value and generates a computation result, and transmits it back to the repeater device.

In step S107, the repeater device receives the computation result from the remote receiving end and stores it, and outputs a confirmation signal based on the first computing mode to the local transmitting end. The repeater device includes a storage unit for receiving the computation result. After receiving the computation result, the repeater device outputs the confirmation signal to the local transmitting end.

In step S109, the repeater device determines whether a query signal is received. In step S111, the repeater device outputs the computation result to the local transmitting end for verification. When the repeater device receives the query signal from the local transmitting end, it transmits the computation result to the local transmitting end for verification. The local transmitting end calculates the elapsed time from transmitting the query signal to receiving the computation result, in order to determine whether the elapsed time satisfies the time limitation. The repeater device is closer to the local transmitting end than the remote receiving end; in particular, it is located within the transmission range that can satisfy the above-described time limitation. This way, the repeater device can timely transmit the computation result from the remote receiving end to the local transmitting end, while extending the distance of the remote receiving end.

Figure 5:
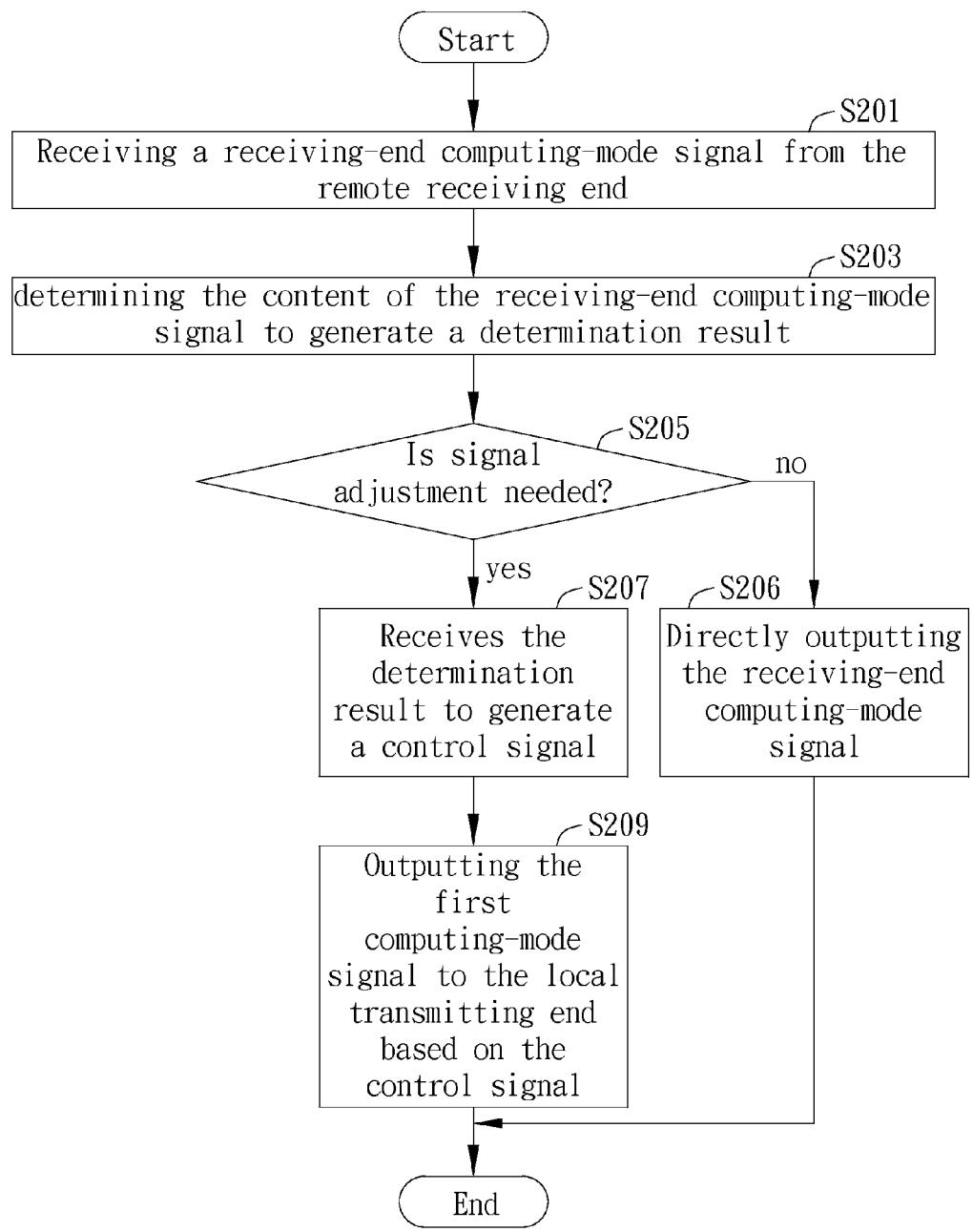
FIG. 5 is a flow chart showing the setting of the first computing mode used in the first embodiment.

FIG. 5 is a flow chart showing the setting of the first computing mode used in this embodiment. As shown in FIG. 5, the setting of the first computing mode includes steps S201 to S209. In step S201, the repeater device receives a receiving-end computing-mode signal from the remote receiving end. In step S203, the repeater device determines the content of the receiving-end computing-mode signal to generate a determination result. Specifically, the signal receiving module of the repeater device determines the content of the receiving-end computing-mode signal to generate the determination result.

In step S205, the repeater device determines whether to perform signal adjustment. If the signal receiving module of the repeater device determines that the content of the receiving-end computing-mode signal does not comply with the computing mode required by the local transmitting end (such as the first computing mode), then the determination result indicates that signal adjustment is required, and the determination result is forwarded to the signal adjustment module (continue to step S207). On the other hand, in step S206, if the signal receiving module of the repeater device determines that the content of the receiving-end computing-mode signal complies with the computing mode required by the local transmitting end, it directly outputs the receiving-end computing-mode signal.

In step S207, the signal adjustment module receives the determination result, and generates a control signal and transmits it back to the signal receiving module. In step S209, the signal receiving module outputs, based on the control signal, the first computing-mode signal to the local transmitting end. This way, the repeater device can set the local transmitting end to the first computing mode.

Figure 6:
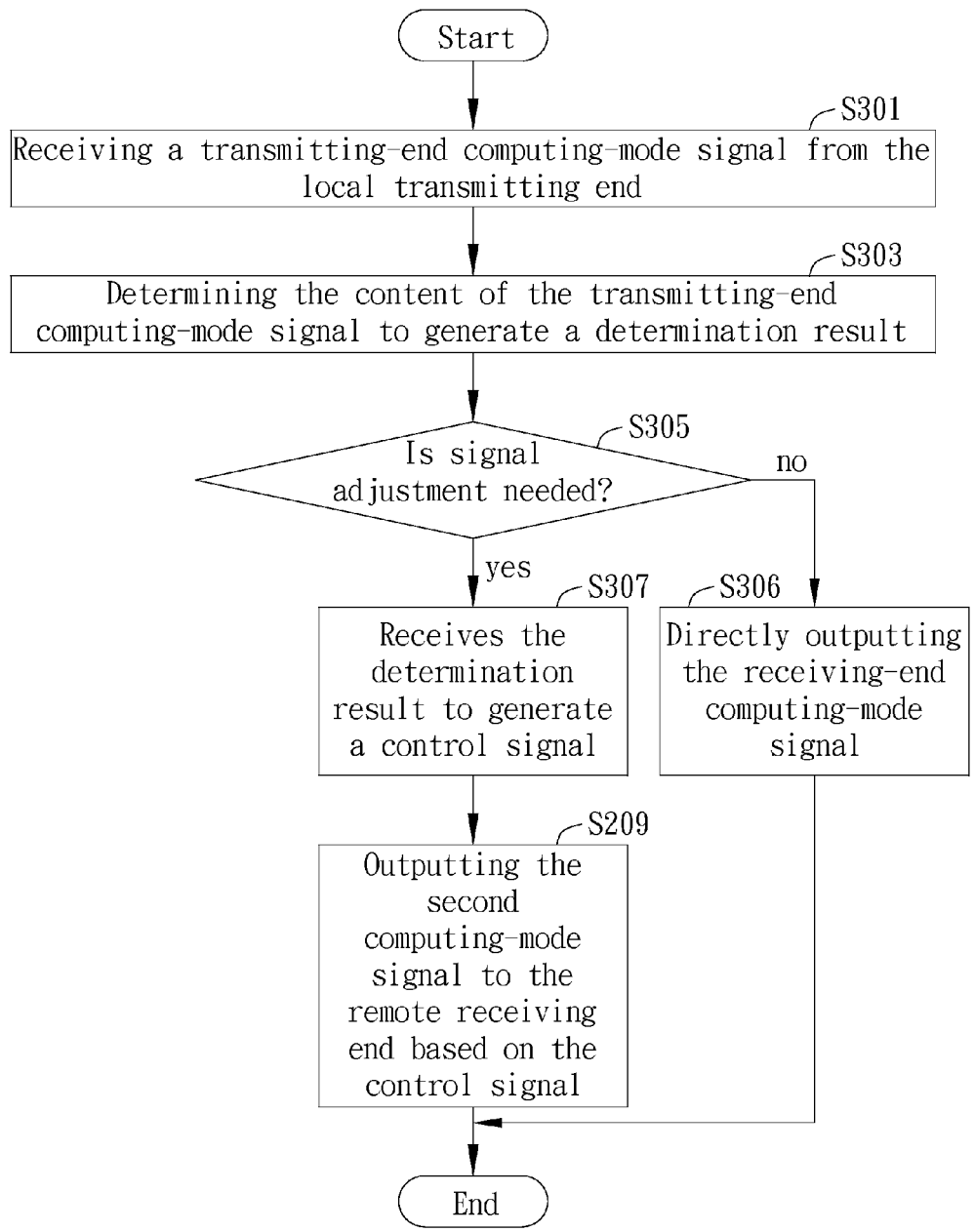
FIG. 6 is a flow chart showing the setting of the second computing mode used in the first embodiment.

FIG. 6 is a flow chart showing the setting of the second computing mode used in this embodiment. As shown in FIG. 6, the setting of the second computing mode includes steps S301 to S309. In step S301, the repeater device receives a transmitting-end computing-mode signal from the local transmitting end. In step S303, the repeater device determines the content of the transmitting-end computing-mode signal to generate a determination result. Specifically, the signal receiving module of the repeater device determines the content of the transmitting-end computing-mode signal to generate the determination result.

In step S305, the repeater device determines whether to perform signal adjustment. If the signal receiving module of the repeater device determines that the content of the transmitting-end computing-mode signal does not comply with the computing mode required by the remote receiving end (such as the second computing mode), then the determination result indicates that signal adjustment is required, and the determination result is forwarded to the signal adjustment module (continue to step S307). On the other hand, in step S306, if the signal receiving module of the repeater device determines that the content of the transmitting-end computing-mode signal complies with the computing mode required by the remote receiving end, it directly outputs the transmitting-end computing-mode signal.

In step S307, the signal adjustment module receives the determination result, and generates a control signal and transmits it back to the signal receiving module. In step S309, the signal receiving module outputs, based on the control signal, the second computing-mode signal to the remote receiving end. This way, the repeater device can set the remote receiving end to the second computing mode. In one implementation, the first computing mode and second computing mode are set using the HDCP version 2.1 protocol as the first communication protocol.

Figure 7:
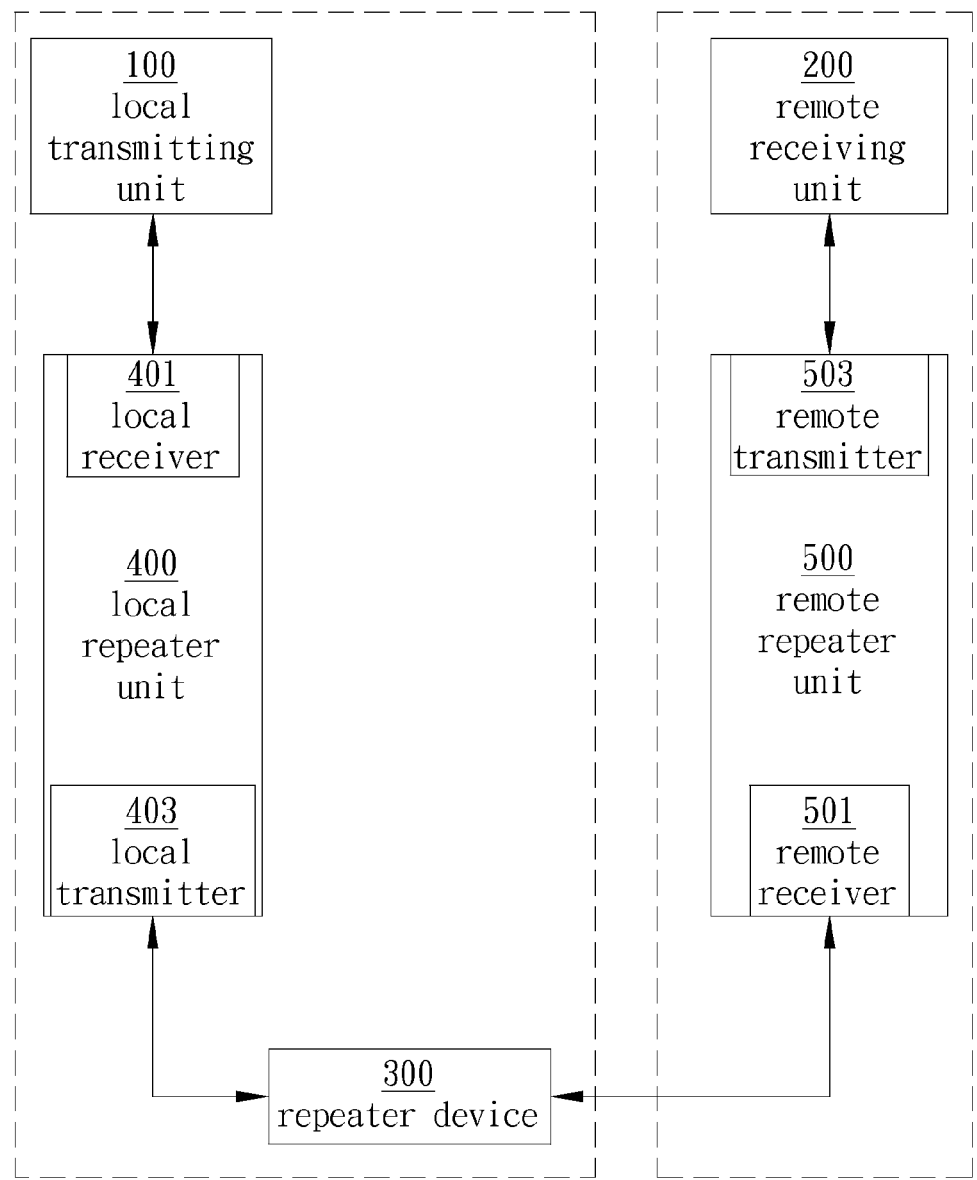
FIG. 7 schematically illustrates a communication verification system according to a second embodiment of the present invention.

FIG. 7 schematically illustrates a communication verification system according to a second embodiment of the present invention. Differences between this embodiment and the first embodiment include: The communication verification system of FIG. 7 uses the repeater device described earlier in conjunction with a local repeater unit and a remote repeater unit to accomplish extension of the remote receiving end. As shown in FIG. 7, in addition to the transmitting unit 100, the receiving unit 200, and the repeater device 300, the communication verification system also includes a local repeater unit 400 and a remote repeater unit 500. In one implementation, the communication verification system use devices that comply with a first communication protocol, such as HDCP devices. The local repeater unit 400 includes a local receiver 401 and local transmitter 403; the local receiver 401 is coupled to the transmitting unit 100, and the local transmitter 403 is coupled to the repeater device 300. The repeater device 300 is coupled to the local repeater unit 400 and is located close to the local repeater unit 400; as shown in FIG. 7, the transmitting unit 100, the local repeater unit 400 and the repeater device 300 are depicted in the same dashed-line box, which is referred to as the local end. The remote repeater unit 500 includes a remote receiver 501 and remote transmitter 503; the remote transmitter 503 is coupled to the receiving unit 200, and the remote receiver 501 is coupled to the repeater device 300. The receiving unit 200 and the remote repeater unit 500 are depicted in the same dashed-line box, which is referred to as the remote end. In other words, the repeater device 300 is located closer to the local transmitter 403 of the local repeater unit 400 than the remote receiver 501 of the remote repeater unit 500 is. In this embodiment, the local repeater unit 400 and the remote repeater unit 500 are set to different computing modes. Specifically, the local transmitter 403 and the remote receiver 501 are set to different computing modes, and they accomplish signal transmission and device verification via the repeater device 300.

Further, in the embodiment of FIG. 7, during the setting stage described earlier, the repeater device 300 sets the computing modes of the local transmitter 403 of the local repeater unit 400 and the remote receiver 501 of the remote repeater unit 500. Similar to the earlier-described method, the repeater device 300 receives a transmitting-end computing-mode signal form the local transmitter 403. The signal receiving module 302 determines the content of the transmitting-end computing-mode signal to generate a determination result, to determine whether the signal adjusting module 304 is to perform signal adjustment. If the determination result indicates that signal adjustment is required, the signal adjusting module 304 generates a control signal, and the repeater device 300 outputs the second computing-mode signal to the remote receiver 501.

On the other hand, the repeater device 300 receives a receiving-end computing-mode signal from the remote receiver 501. The signal receiving module 302 determines the content of the receiving-end computing-mode signal to generate a determination result, to determine whether the signal adjusting module 304 is to perform signal adjustment. If the determination result indicates that signal adjustment is required, the signal adjusting module 304 generates a control signal, and the repeater device 300 outputs the first computing-mode signal to the local transmitter 403. This way, the computing mode setting for the local transmitter 403 and remote receiver 501 are accomplished. In one implementation, the first computing mode and second computing mode are set using the HDCP version 2.1 protocol as the first communication protocol.

In an alternative embodiment, the communication verification system uses a first communication protocol and a second communication protocol. For example, between the local transmitter 403 and the repeater device 300 and between the repeater device 300 and the remote receiver 501, the first communication protocol may be used (such as the HDCP version 2.1 protocol). Further, between the local receiver 401 and the transmitting unit 100 and between the remote transmitter 503 and the receiving unit 200, a second communication protocol may be used, such as any version of HDCP protocol (e.g. HDCP 1.4, HDCP 2.0, HDCP 2.1, HDCP 2.2). This way, the local transmitter 403, the repeater device 300 and the remote receiver 501 can perform verification using a standard operation mode under a predetermined communication protocol, while the transmitting unit 100 coupled to the local receiver 401 and the receiving unit 200 coupled to the remote transmitter 503 are not limited to using particular version of a communication protocol, so that devices coupled to the local repeater unit 400 and remote repeater unit 500 can be selected with more flexibility.

In the verification stage of the second embodiment, a difference from the first embodiment is that in the second embodiment, the local transmitter 403 of the local repeater unit 400 performs verification for the remote receiver 501 of the remote repeater unit 500. Thus, similar to the earlier described method, the local transmitter 403 outputs an initial value. The repeater device 300 receives the initial value from the local transmitter 403 and outputs an initial value based on the second computing mode to the remote receiver 501. The remote receiver 501 receives the initial value and generates a computation result, and transmits it back to the repeater device 300. The repeater device 300 receives the computation result from the remote receiver 501 and stores it, and outputs a confirmation signal to the local transmitter 403 based on the first computing mode. As mentioned earlier, after receiving the computation result, the repeater device 300 can store it in the storage unit 330. Then, after the local transmitter 403 receives the confirmation signal, it outputs a query signal. When the repeater device 300 receives the query signal from the local transmitter 403, the repeater device 300 outputs the computation result to the local transmitter 403 for verification. Under the first computing mode, the local transmitter 403 determines whether the elapsed time between transmitting the query signal and receiving the computation result satisfies the time limitation. If the computation result is correct and the elapsed time satisfies the time limitation, the local repeater unit 400 determines that the remote repeater unit 500 is an authorized device. This way, the remote repeater unit 500 is not limited to the transmission range determined by the time limitation which is set by the local repeater unit 400 under the first computing mode. In turn, the receiving unit 200 is not limited to the transmission range determined by the local repeater unit 400, so that the distance of the receiving unit 200 from the transmitting unit 100 can be extended. This provides more flexibility to the overall configuration of the system. It also provides compatibility with earlier or later versions of the communication protocol by using the coupling of the repeater device.

Figure 8:
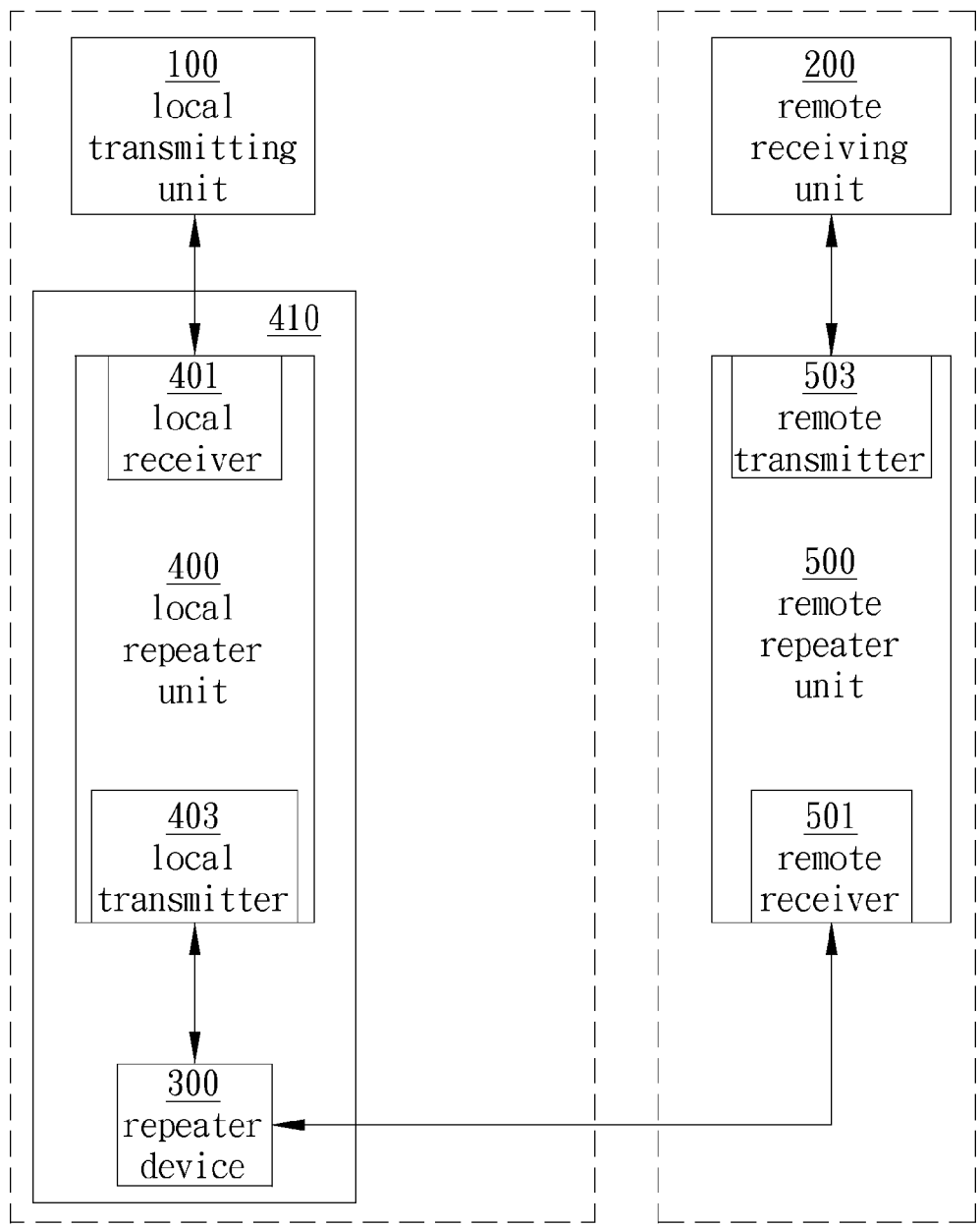
FIG. 8 schematically illustrates a communication verification system according to a third embodiment of the present invention.

FIG. 8 schematically illustrates a communication verification system according to a third embodiment of the present invention. In the previous embodiment, the repeater device and the local repeater unit are two independent devices. As shown in FIG. 8, a local repeater module 410 includes the repeater device 300 and the local repeater unit 400. This way, the repeater device 300 is not only located within the transmission range of the local transmitter 403, it is further integrated with the local repeater unit 400 into one device. Other than that, the computing mode setting and verification process of the communication verification system of FIG. 8 are similar to those of the earlier embodiment and are not described in detail here.

To summarize, the communication verification systems shown in FIGS. 7 and 8 use the repeater device 300 to set the local transmitter 403 and remote receiver 501 to different settings (i.e. different computing modes). By locating the repeater device within a transmission range that satisfies the above-described time limitation (i.e. the repeater device is close to the local transmitting end), and by using the different settings, the repeater device 300 can, before outputting the confirmation signal, store the computation result from the remote receiver 501; after transmitting the confirmation signal, it can ensure that the computation result can be transmitted to the local transmission end within the time limitation. This way, the distance between the remote receiver 501 and the local transmitter 403 can be extended.

It will be apparent to those skilled in the art that various modification and variations can be made in the method and apparatus of the present invention without departing from the spirit or scope of the invention. Thus, it is intended that the present invention cover modifications and variations that come within the scope of the appended claims and their equivalents.

What is claimed is:

1. A communication verification method, used with devices that comply with a first communication protocol, the method comprising:

setting a local transmitting unit to a first computing mode, and setting a remote receiving unit to a second computing mode;

a repeater device receiving an initial value from the local transmitting unit, and outputting the initial value to the remote receiving unit according to the second computing mode;

the repeater device receiving from the remote receiving unit a computation result which has been generated by the remote receiving unit in response to the initial value, storing the computation result in a storage unit of the repeater device, and outputting a confirmation signal to the local transmitting unit according to the first computing mode; and thereafter, the repeater device receiving a query signal from the local transmitting unit, and in response to receiving the query signal, outputting the computation result that has been stored in the storage unit to the local transmitting unit for verification by the local transmitting unit.

2. The communication verification method of claim 1, wherein the step of setting the local transmitting unit to the first computing mode comprises:

receiving a receiving-end computing-mode signal from the remote receiving unit;

determining a content of the receiving-end computing-mode signal to generate a determination result;

receiving the determination result to generate a control signal; and outputting a first computing-mode signal to the local transmitting unit based on the control signal.

3. The communication verification method of claim 1, wherein the step of setting the remote receiving unit to the second computing mode comprises:

receiving a transmitting-end computing-mode signal from the local transmitting unit;

determining a content of the transmitting-end computing-mode signal to generate a determination result;

receiving the determination result to generate a control signal; and outputting a second computing-mode signal to the remote receiving unit based on the control signal.

4. The communication verification method of claim 1, wherein the first and second computing modes are set using the HDCP version 2.1 protocol as the first communication protocol.

5. The communication verification method of claim 1, wherein the repeater device is located closer to the local transmitting unit that the remote receiving unit is.

6. The communication verification method of claim 1, wherein the second computing mode is different from the first computing mode.

7. A communication verification system, used with devices that comply with a first communication protocol, the system comprising:

a local transmitting unit, which is set to a first computing mode and which outputs an initial value;

a remote receiving unit, which is set to a second computing mode; and a repeater device, for receiving the initial value from the local transmitting unit and outputting the initial value to the remote receiving unit according to the second computing mode, the repeater device receiving from the remote receiving unit a computation result which has been generated by the remote receiving unit in response to the initial value and storing the computation result in a storage unit of the repeating device, and outputting a confirmation signal to the local transmitting unit according to the first computing mode;

wherein after storing the computation result in the storage unit, the repeater device receives a query signal from the local transmitting unit, and in response to receiving the query signal, outputs the computation result that has been stored in the storage unit to the local transmitting unit for verification by the local transmitter.

8. The communication verification system of claim 7, wherein the repeater device receives a receiving-end computing-mode signal from the remote receiving unit and receives a transmitting-end computing-mode signal from the local transmitting unit, the repeater device further comprising:
   a signal receiver, for respectively determining a content of the receiving-end computing-mode signal and a content of the transmitting-end computing-mode signal to generate a determination result; and
   a signal adjuster, for receiving the determination result to generate a control signal, wherein the repeater device outputs a first computing-mode signal to the local transmitting unit and outputs a second computing-mode signal to the remote receiving unit based on the control signal.

9. The communication verification system of claim 7, wherein the first and second computing modes are set using the HDCP version 2.1 protocol as the first communication protocol.

10. The communication verification system of claim 7, wherein the repeater device is located closer to the local transmitting unit that the remote receiving unit is.

11. The communication verification system of claim 7, wherein the second computing mode is different from the first computing mode.

12. A communication verification system, used with devices that comply with a first communication protocol, the system comprising:
   a local receiver, coupled to a transmitting unit;
   a local transmitter, which is set to a first computing mode and which outputs an initial value;
   a remote transmitter, coupled to a receiving unit;
   a remote receiver, which is set to a second computing mode; and
   a repeater device, for receiving the initial value from the local transmitter and outputting the initial value to the remote receiver according to the second computing mode, the repeater device receiving from the remote receiver a computation result which has been generated by the remote receiving unit in response to the initial value and storing the computation result in a storage unit of the repeating device, and outputting a confirmation signal to the local transmitter according to the first computing mode;
   wherein a communication between the local receiver and the transmitting unit complies with a second communication protocol, a communication between the remote transmitter and the receiving unit complies with the second communication protocol, and
   wherein after storing the computation result in the storage unit, the repeater device receives a query signal from the local transmitter, and in response to receiving the query signal, outputs the computation result that has been stored in the storage unit to the local transmitter for verification by the local transmitter.

13. The communication verification system of claim 12, wherein the repeater device receives a receiving-end computing-mode signal from the remote receiver and receives a transmitting-end computing-mode signal from the local transmitter, the repeater device further comprising:
   a signal receiver, for respectively determining a content of the receiving-end computing-mode signal and a content of the transmitting-end computing-mode signal to generate a determination result; and
   a signal adjuster, for receiving the determination result to generate a control signal, wherein the repeater device outputs a first computing-mode signal to the local transmitter and outputs a second computing-mode signal to the remote receiver based on the control signal.

14. The communication verification system of claim 12, wherein the first and second computing modes are set using the HDCP version 2.1 protocol as the first communication protocol.

15. The communication verification system of claim 12, wherein the repeater device is located closer to the local transmitting unit that the remote receiving unit is.

16. The communication verification system of claim 12, wherein the second computing mode is different from the first computing mode.

* * * * *